(No Model.)  2 Sheets—Sheet 1.

J. IMLER.
COMBINED ROTARY DISK HARROW AND SEED SOWER.

No. 282,526. Patented Aug. 7, 1883.

WITNESSES:
Frank A. Jacob.
E. E. Sickler.

INVENTOR:
John Imler
By H. P. Hood
Atty (No Model.) 2 Sheets—Sheet 2.

J. IMLER.
COMBINED ROTARY DISK HARROW AND SEED SOWER.

No. 282,526. Patented Aug. 7, 1883.

WITNESSES:
Frank A. Jacob.
E. E. Sickler.

INVENTOR:
John Imler.
By H. P. Hood
Atty.

UNITED STATES PATENT OFFICE.

JOHN IMLER, OF ZIONSVILLE, INDIANA.

COMBINED ROTARY-DISK HARROW AND SEED-SOWER.

SPECIFICATION forming part of Letters Patent No. 282,526, dated August 7, 1883.

Application filed March 21, 1883. (No model.)

*To all whom it may concern:*

Be it known that I, JOHN IMLER, a citizen of the United States, residing at Zionsville, in the county of Boone and State of Indiana, have invented a new and useful Improved Combined Rotary-Disk Harrow and Seed-Sower, of which the following is a specification, having reference to the accompanying drawings.

My improvement relates to a means for combining a rotary-disk harrow with a seed-sower; and the objects of my improvement are, first, to so combine the two machines that the operations of preparing the ground and sowing the seed may be simultaneous, or the harrow readily detached from the seed-sower and used independently when desired; second, to so connect and combine the two machines that the harrow may be raised out of contact with the ground or set to enter the ground to any desired depth; and, third, to so combine and connect the two machines that the seed-sower will be thrown out of gear simultaneous with and by the same operation that raises the harrow out of the ground.

The accompanying drawings illustrate my invention.

Figure 2:
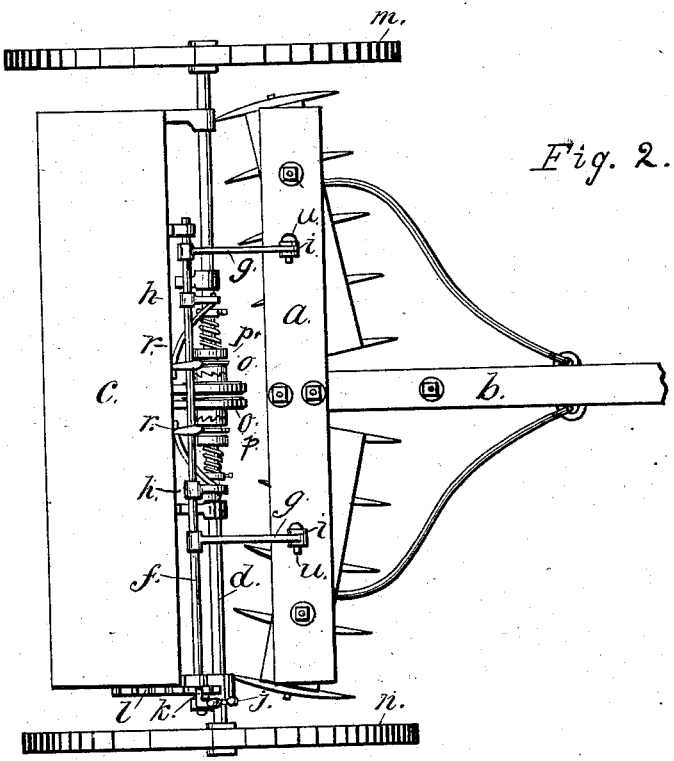
Figure 1:
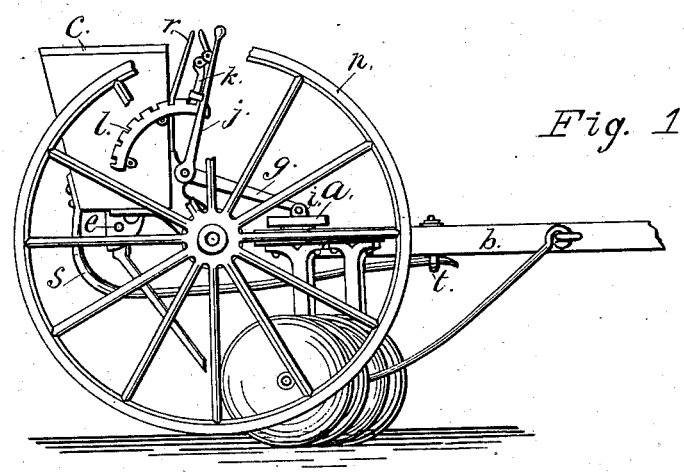
Figure 4:
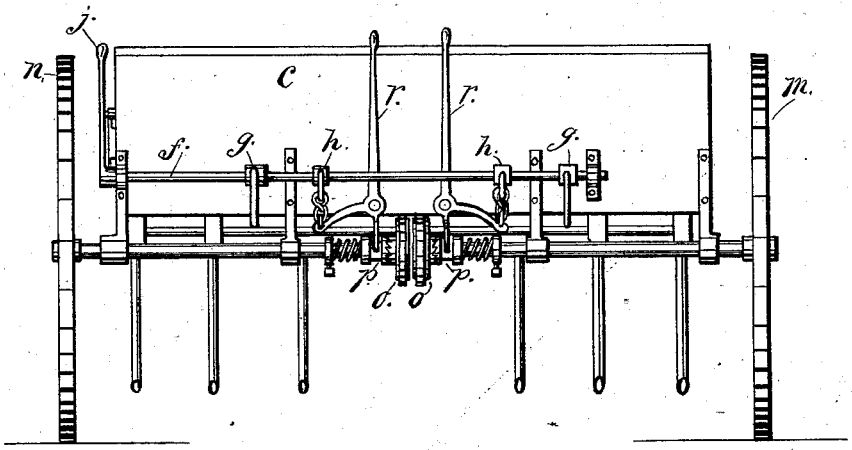
Figure 3:
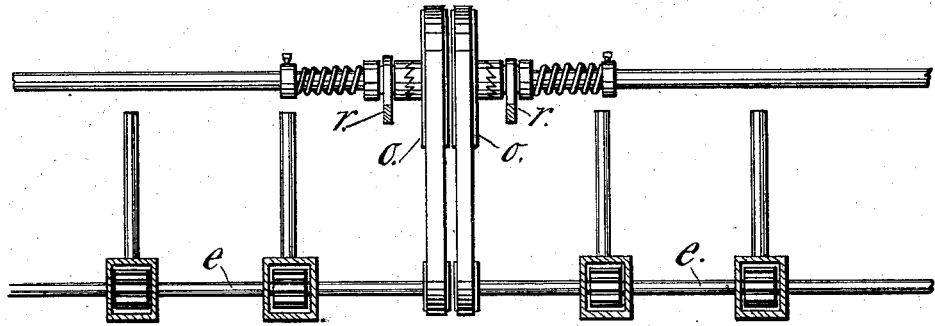

Figure 1 is a side elevation. Fig. 2 is a plan. Fig. 3 is an enlarged partial plan with the seed-box removed, showing the connection between the axle of the seed-sower and the feed-wheel shafts. Fig. 4 is a front elevation with the harrow removed.

Like letters indicate the same parts in all figures.

*a* represents the frame of an ordinary disk-harrow; *b*, the draft-pole attached to said frame.

*c* represents the seed-box, *d* the axle, and *e* the feed-shaft, of an ordinary seed-sower without draft-pole or opening-hoes. Across the front of the seed-box a shaft, *f*, is secured in suitable bearings, so that it is free to partially revolve. Shaft *f* is provided with arms *g g*, rigidly secured thereto, and also shorter arms *h h*, similarly secured. Arms *g g* have an eye or bolt-hole at the outer end of each, by means of which they are connected to the top of harrow-frame *a* by bolts *u u*, passing through the lugs *i i* and said arms. A lever, *j*, is fastened on the shaft *f*, and is provided with a sliding pawl, *k*, which engages a segment-rack, *l*, fastened to the seed-box. The axle *d* is in two parts, which revolve in suitable bearings secured to the seed-box, the carrying-wheels *m n* being rigidly secured to said axle.

The inner end of each section of the axle is furnished with a loose pulley, *o o*, and said pulleys are connected by belts with fast pulleys on the feed-shaft. Sliding clutches *p p* on each section of the axle revolve therewith, and are thrown into and out of connection with pulleys *o o* by means of bell-crank levers *r r*. For the purpose of operating said levers simultaneously with and by the same operation that the harrow-frame is raised, and thereby raising the harrow out of the ground and stopping the dropping of the feed at the same time, arms *h h* are connected with the short arms of levers *r r* by means of short chains.

For the purpose of preventing the seed-sower from turning or tipping backward on its axle, a brace-rod, *s*, is secured to the seed-box, as shown, which, running forward, passes through an eyebolt, *t*, in the under side of the tongue in such manner that the brace rests against the under side of the tongue and is free to slide in the eyebolt.

The operation of my device is as follows: The harrow is raised and lowered relatively to the seed-sower by means of the lever *j*, turning shaft *f* and raising arms *g g*, being retained in position by the segment-rack *l* and pawl *k*. As the shaft *f* is turned in raising the harrow the clutches *p p* are slid on the axle and disengaged from the pulleys *o o* by the raising of the short arms *h h*, operating bell-crank levers *r r*, and the feed movement of the seed-sower is thereby stopped. By simply removing bolts *u u* the harrow is disconnected from the seed-sower, and may then be used independently.

I claim as my invention—

1. In a combined rotary-disk harrow and seed-sower, the shaft *f*, arms *g g* and *h h*, lever *j*, pawl *k*, and rack *l*, bell-crank levers *r r*, clutches *p p*, and pulleys *o o*, all combined in the manner and for the purpose specified.

2. In a combined rotary-disk harrow and seed-sower, brace-rod *s*, secured to the seed-sower, and means for detachably securing the free end of said rod to the draft-pole, substantially as shown and described.

JOHN IMLER.

Witnesses:
FRANK A. JACOBS,
H. P. HOOD.